(12) United States Patent
Chin et al.

(10) Patent No.: US 10,613,654 B2
(45) Date of Patent: Apr. 7, 2020

(54) COMPUTER SYSTEM AND INPUT METHOD THEREOF

(71) Applicant: ELAN MICROELECTRONICS CORPORATION, HsinChu (TW)

(72) Inventors: Wei-Liang Chin, Hsinchu (TW); Chia-Chun Liu, Kaohsiung (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/026,036

(22) Filed: Jul. 2, 2018

(65) Prior Publication Data

US 2019/0094998 A1 Mar. 28, 2019

(30) Foreign Application Priority Data

Sep. 28, 2017 (TW) .............................. 106133366 A

(51) Int. Cl.
*G06F 3/041* (2006.01)
*G06F 3/0354* (2013.01)
*G06F 3/0488* (2013.01)
*G06F 3/01* (2006.01)
*G06F 1/16* (2006.01)
*G06F 3/044* (2006.01)

(52) U.S. Cl.
CPC ............ *G06F 3/041* (2013.01); *G06F 1/1615* (2013.01); *G06F 3/016* (2013.01); *G06F 3/03545* (2013.01); *G06F 3/04162* (2019.05); *G06F 3/04883* (2013.01); *G06F 3/0442* (2019.05); *G06F 3/0446* (2019.05); *G06F 2203/04106* (2013.01); *G06F 2203/04114* (2019.05)

(58) Field of Classification Search
CPC ...... G06F 3/041; G06F 3/016; G06F 3/03545; G06F 3/04883; G06F 2203/04106
USPC ........................................................ 345/173
See application file for complete search history.

(56) References Cited

U.S. PATENT DOCUMENTS

2006/0119588 A1* 6/2006 Yoon ..................... G06F 3/0488
                                                           345/173
2009/0033632 A1* 2/2009 Szolyga ................ G06F 1/1616
                                                           345/173

(Continued)

FOREIGN PATENT DOCUMENTS

TW         201017493          5/2010
TW         201044238 A1      12/2010

(Continued)

*Primary Examiner* — Jennifer Mehmood
*Assistant Examiner* — Ngan T Pham Lu
(74) *Attorney, Agent, or Firm* — Muncy, Geissler, Olds & Lowe, P.C.

(57) ABSTRACT

The present invention discloses an input method for a computer system. The computer system includes an operating system, a screen and a touch control module. The touch control module includes a nontransparent touch pad. The method includes the following steps: generating, by the touch control module, a plurality of first coordinates corresponding to movement of a stylus; sending, by the touch control module, the plurality of first coordinates to the operating system according to a stylus packet format utilized by the operating system; converting, by the operating system, the plurality of first coordinates to a plurality of second coordinates corresponding to the screen; and displaying a track on the screen according to the plurality of second coordinates.

16 Claims, 5 Drawing Sheets

(56) References Cited

U.S. PATENT DOCUMENTS

2013/0106589 A1\* 5/2013 Posamentier .......... G06F 3/016
                                                    340/407.1
2016/0306447 A1\* 10/2016 Fleck ................. G06F 3/03545

FOREIGN PATENT DOCUMENTS

| TW | 201403408 A | 1/2014 |
| TW | 201447650 A | 12/2014 |
| TW | 201642114 A | 12/2016 |
| TW | 201706824 A | 2/2017 |

\* cited by examiner

| Byte# | Bit 7 | Bit 6 | Bit 5 | Bit 4 | Bit 3 | Bit 2 | Bit 1 | Bit 0 |
|---|---|---|---|---|---|---|---|---|
| | HID Pen Report Format | | | | | | | |
| 1 | 0x0E | | | | | | | |
| 2 | 0x00 | | | | | | | |
| 3 | Report ID (0x7) | | | | | | | |
| 4 | Reserved | | | Eraser | Invert | Barrel | Tip | In Range |
| 5 | X coordinate of contact position (LSB) | | | | | | | |
| 6 | X coordinate of contact position (MSB) | | | | | | | |
| 7 | Y coordinate of contact position (LSB) | | | | | | | |
| 8 | Y coordinate of contact position (MSB) | | | | | | | |
| 9 | Tip Pressure (LSB) | | | | | | | |
| 10 | Tip Pressure (MSB) | | | | | | | |
| 11 | Battery Strength | | | | | | | |
| 12 | Vender Define (LSB) | | | | | | | |
| 13 | Vender Define (MSB) | | | | | | | |
| 14 | Button 7 | Button 6 | Button 5 | Button 4 | Button 3 | Button 2 | Button 1 | Button 0 |

FIG. 3

COMPUTER SYSTEM AND INPUT METHOD THEREOF

BACKGROUND OF THE INVENTION

1. Field of the Invention

The present invention relates to a computer system, and more particularly, to an input method applying a stylus in a computer system.

2. Description of the Prior Art

Currently available laptops are equipped with a touch screen and touch pad. Several of the touch screens support an active stylus, allowing the active stylus to operate on the touch screens. The operating system of a laptop, such as Windows 10, provides a handwriting input window on the touch screen for the user. The user may write characters in the handwriting input window by using the active stylus. However, writing on the touch screen of the laptop with the stylus may easily cause the touch screen to sway, which is inconvenience for the user. Thus, there is a need for improvement over the prior art.

SUMMARY OF THE INVENTION

It is therefore an objective of the present invention to provide a computer system and input method thereof, which are capable of allowing an active stylus to perform input on the touch pad of the laptop.

An embodiment of the present invention discloses an input method for a computer system. The computer system comprises an operating system, a screen and a touch control module. The touch control module comprises a nontransparent touch pad. The method comprises the following steps: generating, by the touch control module, a plurality of first coordinates corresponding to movement of a stylus; sending, by the touch control module, the plurality of first coordinates to the operating system according to a stylus packet format utilized by the operating system; converting, by the operating system, the plurality of first coordinates to a plurality of second coordinates corresponding to the screen; and displaying a track on the screen according to the plurality of second coordinates.

Another embodiment of the present invention discloses a computer system, which comprises a screen, an operating system, a touch control module and an application program. The touch control module, coupled to the operating system, comprises a nontransparent touch pad for detecting approach or contact of a stylus. The application program is installed in the operating system. The touch control module generates a plurality of first coordinates corresponding to movement of the stylus. The touch control module sends the plurality of first coordinates to the operating system according to a stylus packet format utilized by the operating system. The operating system converts the plurality of first coordinates to a plurality of second coordinates corresponding to the screen. The application program displays a track on the screen according to the plurality of second coordinates.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of a packet format for stylus.

DETAILED DESCRIPTION

Figure 1:
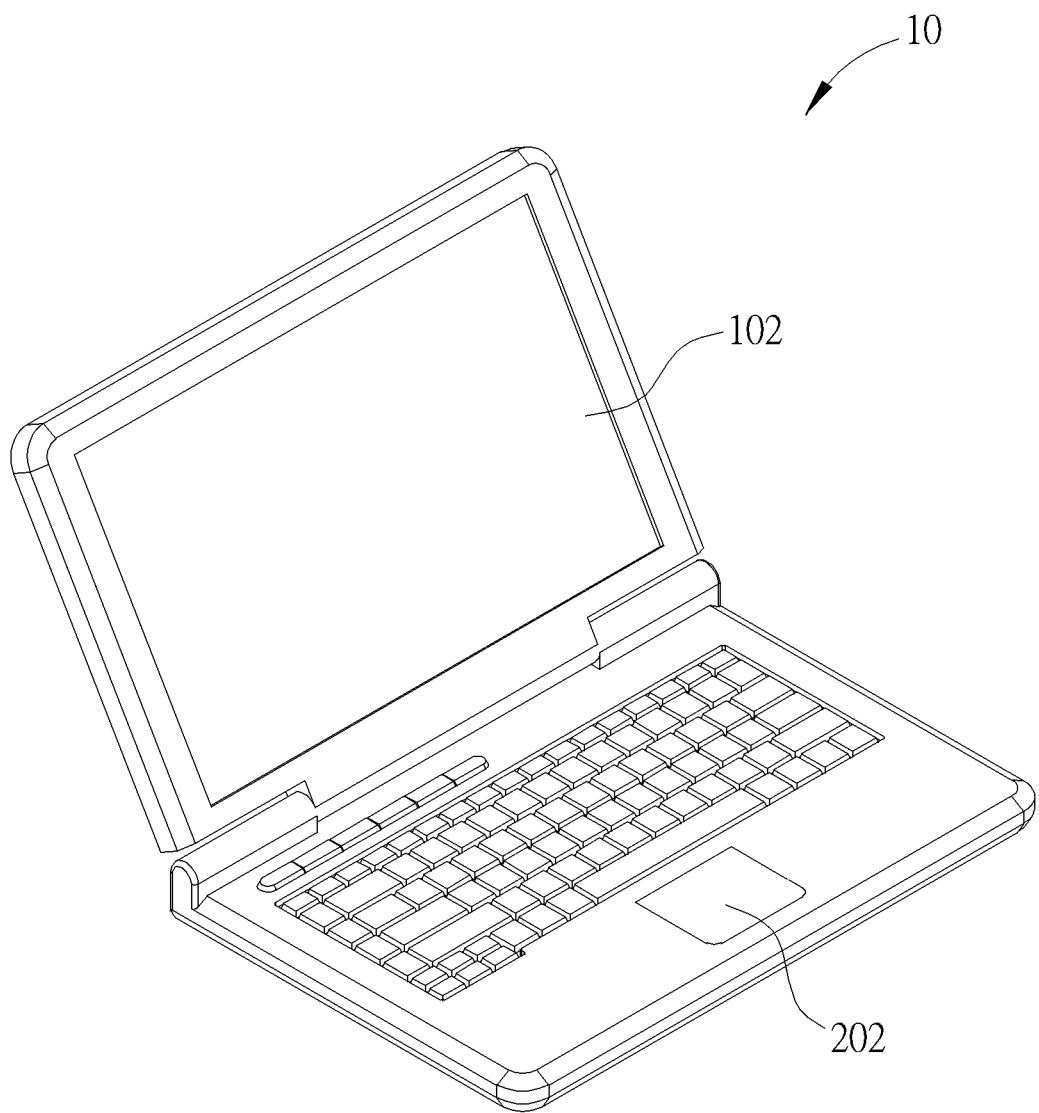
FIG. 1 is a schematic diagram of a laptop according to an embodiment of the present invention.

FIG. 1 illustrates an application of the present invention. A laptop 10 includes a screen 102 and a touch pad 202. The screen 102 may be a touch screen or a screen without touch sensing functions. The touch pad 202 is configured for input by an active stylus. An operating system is included inside the laptop 10, for managing operation of the laptop 10. In an embodiment, the operating system is Windows 10 of Microsoft Cooperation. In an embodiment, an application program installed in the laptop 10 provides a handwriting input block to be displayed on the screen 102. By the present invention, the handwriting of the stylus on the touch pad 202 may be displayed in the handwriting input block.

Figure 2:
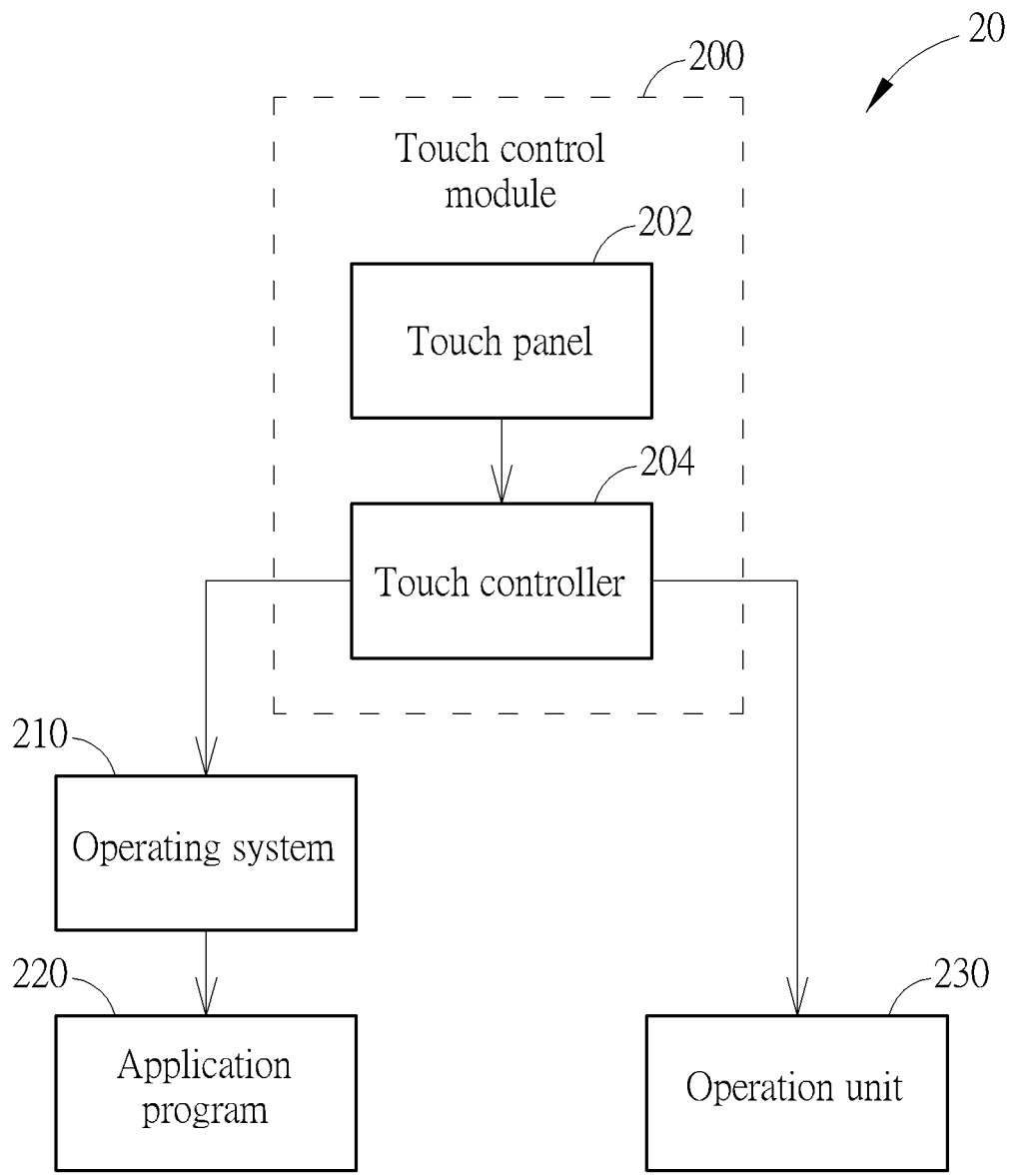
FIG. 2 is a schematic diagram of a computer system according to an embodiment of the present invention.

FIG. 2 illustrates a computer system according to an embodiment of the present invention. The computer system 20 includes a touch control module 200, an operating system 210, an application program 220 and an operation unit 230. The computer system 20 may be, for example, the laptop 10 shown in FIG. 1, but should not be limited herein. The touch control module 200 includes a nontransparent touch pad 202 and a touch controller 204. The touch controller 204 is connected to the touch pad 202, for sensing the touch pad 202. In this embodiment, the touch pad 202 is a capacitive touch pad including multiple first electrodes along the vertical direction and multiple second electrodes along the horizontal direction. The structure and sensing method of the capacitive touch pad is well known by those skilled in the art, and the details are therefore omitted for brevity. The touch controller 204 is coupled to an operating system 210 and an operation unit 230, and the operating system 210 is coupled to the application program 220.

In an embodiment, the operations of the touch control module 200 include an active stylus mode and a general mode. In the general mode, the touch controller 204 provides driving signals to drive the multiple first electrodes or/and multiple second electrodes of the touch pad 202, to detect a contact or approach of a conducting object (e.g., a finger). In the active stylus mode, the touch controller 204 does not provide driving signals. The touch controller 204 senses the multiple first electrodes and multiple second electrodes of the touch pad 202 to detect the signals emitted from an active stylus and determine the location of the active stylus relative to the touch pad 202. In another embodiment, different methods may be used to detect the active stylus in the active stylus mode.

According to the strength of signals received from the active stylus, the touch controller 204 may determine that the active stylus approaches or contacts the touch pad 202. When the touch control module 200 detects no object approaching or contacting the touch pad 202, the touch control module 200 is operated in the active stylus mode and the general mode with time division. In an embodiment, if the touch control module 200 detects an active stylus, e.g., detects that an active stylus approaching or contacting the touch pad, the touch control module 200 is switched to the active stylus mode. The operations and detection of the active stylus are well known by those skilled in the art, and the details are therefore omitted for brevity.

According to the definition of peripheral devices of the operating system 210, the touch controller 204 declares the touch control module 200 as a touch pad and a stylus, so that the operating system 210 identifies the touch control module 200 as a touch pad and a stylus, and shows two hardware devices "HID-compliant pen" and "HID-compliant touch pad" in Device Manager of the operating system 210. The stylus packet format utilized by the operating system 210 may represent the status and coordinate of the stylus. Take the operating system Windows 10 of Microsoft Cooperation as an example, which utilizes a stylus packet format shown in FIG. 3. The stylus packet includes 14 bytes. The $3^{rd}$ byte of the stylus packet denotes type of object, such as stylus or other contact objects. If the touch controller 204 determines that the detected object is a stylus, the value of Report ID is set to 7. The field of the $4^{th}$ byte Tip denotes the status of stylus is hover or contact, wherein "hover" means the stylus approaches but does not contact the touch pad 202. The field Tip having the value "0" stands for hover, and the value "1" stands for contact. The $5^{th}$ to $8^{th}$ bytes denote two-dimensional coordinates of the stylus.

When the touch control module 200 detects a stylus, the touch controller 204 sends data packets to notify the operating system 210 according to the stylus packet format utilized by the operating system. If the touch controller 204 determines that an active stylus approaches the touch pad 202, the touch controller 204 sends data packets with the stylus packet format to notify the operating system 210. The data packets provide the coordinate of the active stylus and the status "hover". If the touch controller 204 determines that an active stylus contacts the touch pad 202, the touch controller 204 sends data packets with the stylus packet format to notify the operating system 210. The data packets provide the coordinate of the active stylus and the status "contact". The operating system 210 may know the status of the stylus is hover over or contact with the touch pad 202 and know the location of the stylus according to the content of the data packets outputted by the touch controller 204. The operations of the touch controller 204 detecting and calculating the location of stylus hover over or contact with the touch pad 202 is well known by those skilled in the art, and will not be narrated herein.

The touch controller 204 calculates the coordinate of the stylus and reports to the operating system 210. The operating system 210 converts the coordinate of the stylus to the coordinate on the screen 102 according to the coordinates reported by the touch controller 204 and the resolution ratio of the screen 102 relative to the touch pad 202. For example, the resolution of the screen 102 is 1200*800 and the resolution of the touch pad 202 is 300*200. The resolution ratio of the screen 102 relative to the touch pad 202 in the horizontal direction is 4 and the resolution ratio of the screen 102 relative to the touch pad 202 in the vertical direction is 4. If the coordinate of the stylus calculated by the touch controller 204 is (30,50), the converted coordinate on the screen 102 would be (120,200). In brief, the coordinate of the four corners of the touch pad 202 correspond to the coordinate of the four corners of the screen 102, respectively. In another embodiment, other methods may be applied to map the coordinate on the touch pad 202 to the coordinate on the screen 102, and these methods are also applicable to the present invention.

Figure 4:
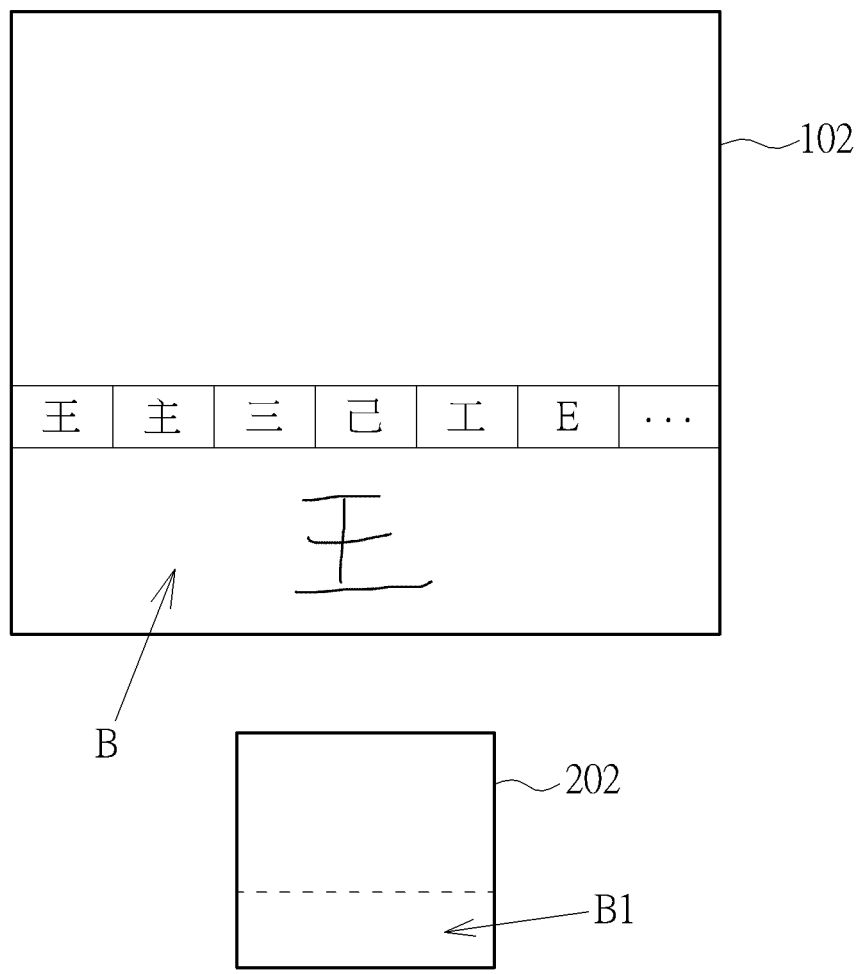
FIG. 4 is a schematic diagram illustrating operations of handwriting recognition software supporting a stylus.

After the operating system 210 converts the coordinate of the stylus reported by the touch controller 204 to the coordinate on the screen 102, the operating system 210 sends the converted coordinate to the application program 220. The application program 220 performs operations according to the coordinate from the operating system 210. For example, the application program 220 is drawing software installed in the operating system 210 that supports drawings with a stylus. When the stylus moves on the touch pad 202, the touch controller 204 continuously outputs a plurality of coordinates of stylus corresponding to movement of the stylus. The operating system 210 converts the coordinates of stylus to a plurality of coordinates corresponding to the screen 102. According to the coordinates continuously sent from the operating system 210, the drawing software displays the input of the stylus on the screen 102 as if the stylus is writing on a touch screen. In another embodiment, the application program 220 is a handwriting recognition software built in the operating system 210. As shown in FIG. 4, the handwriting recognition software provides a handwriting input block B to be displayed on the screen 102, and supports writing in the handwriting input block B with a stylus. The area B1 on the touch pad 202 corresponds to the location and area of the handwriting input block B on the screen 102 with a ratio. For example, the handwriting input block B is located in the lower ¼ part of the screen 102, and the area B1 is the lower ¼ part of the touch pad 202. When the stylus is writing on the area B1 of the touch pad 202, the touch controller 204 continuously sends a plurality of coordinates of stylus corresponding to the writing of the stylus. The operating system 210 converts the coordinates of stylus to a plurality of coordinates corresponding to the screen 102. The handwriting recognition software correspondingly shows the input of the stylus in the handwriting input block B according to the coordinates sent from the operating system 210. Subsequently, the handwriting recognition software recognizes the stylus input, and shows the recognition result in the upper fields of the handwriting input block B. In another embodiment, it may be configured that the entire touch pad 202 corresponds to the handwriting input block B, so that the input of the stylus on the touch pad 202 is correspondingly displayed in the handwriting input block B without the limitation of the area B1.

In an embodiment, when the touch controller 204 detects that the stylus approaches or contacts the touch pad 202, the application program 220 may be enabled. A specific implementation may be that another application program A is applied to detect the pen report from the operating system 210. According to the pen report, the application program A may know whether a stylus approaches the touch pad. When the application program A knows the presence of a stylus, the application program A enables the application program 220. In another embodiment, when the touch controller 204 detects that the stylus contacts the touch pad, the touch controller 204 enables operations of the application program 220.

Please refer to FIG. 2. The touch controller 204 is further connected to an operation unit 230. The communications between the touch controller 204 and the operation unit 230 may utilize the stylus packet format defined by the above operating system, or may utilize another packet format. The operation unit 230 knows that a stylus approaches or contacts the touch pad 202 according to the content of packets outputted from the touch controller 204. When a stylus approaches or contacts the touch pad 202, the operation unit 230 starts to operate. In an embodiment, the operation unit 230 is a hardware device such as a motor module. The motor module may be installed below the touch pad 202, or below the keyboard of the laptop 10. The motor module may generate vibration in response to a stylus approaching or contacting the touch pad 202 to provide tactile feedback. In another embodiment, the operation unit 230 is an application software or program, and the application software or program may automatically enable in response to the stylus approaching or contacting the touch pad 202.

The above embodiments mostly illustrate the operations of the present invention by taking the active stylus as examples. In another embodiment, if the touch controller 204 may identify the passive stylus as a stylus instead of a finger, the passive stylus may also be applicable in the present invention.

In the prior art, the stylus may perform input on the touch screen to perform drawing or handwriting input, but currently available laptops cannot receive input of stylus via the touch pad to perform drawing or handwriting input and other functions. In comparison, in the present invention, the touch pad may receive input from a stylus and the track of the stylus may be displayed on the screen, so as to realize the above drawing or handwriting functions. The touch screen has been developed for a long time. If a user writes on the touch screen of the laptop by using a stylus, it easily causes the touch screen to sway, which is unfavorable in writing. According to the present invention, the user is able to use a stylus to perform input on the touch pad of the laptop, which apparently solves the long-term problem.

Figure 5:
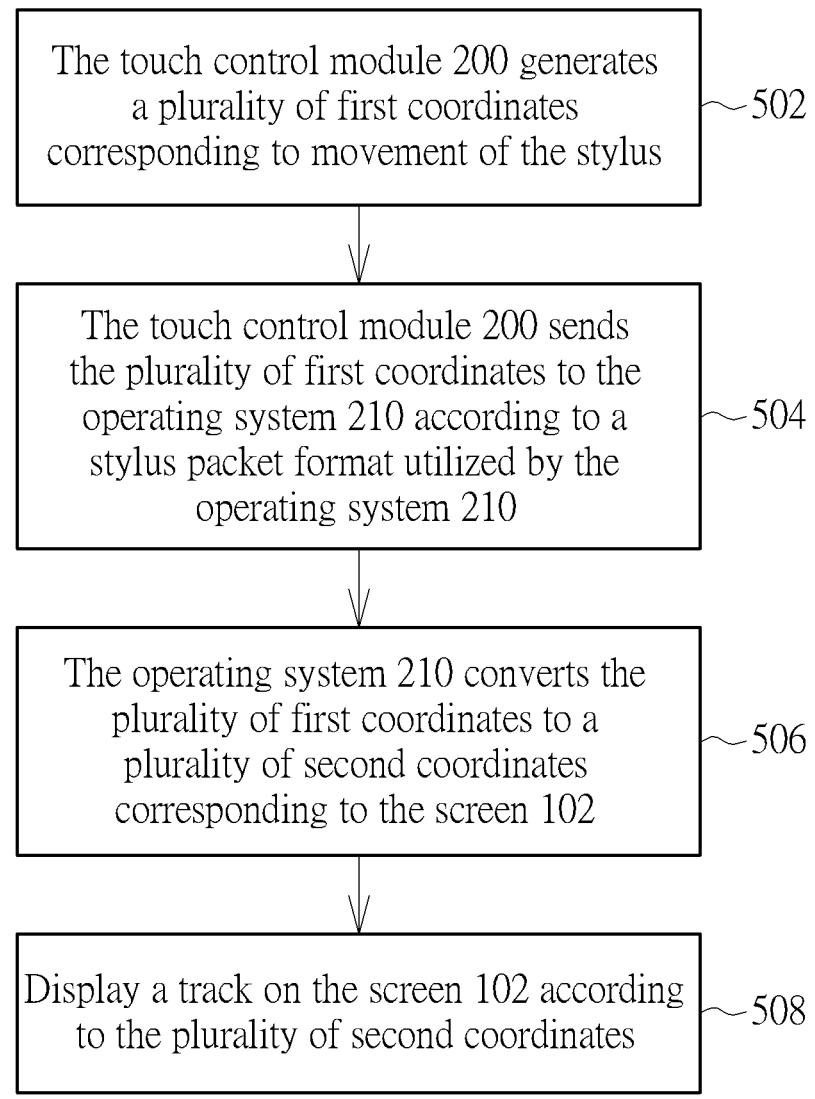
FIG. 5 is a flow chart of displaying a track on the screen in response to movement of the stylus according to an embodiment of the present invention.

The above method of displaying a track on the screen in response to movement of the stylus may be interpreted as including the following steps, as shown in FIG. 5:

Step 502: The touch control module 200 generates a plurality of first coordinates corresponding to movement of the stylus.

Step 504: The touch control module 200 sends the plurality of first coordinates to the operating system 210 according to a stylus packet format utilized by the operating system 210.

Step 506: The operating system 210 converts the plurality of first coordinates to a plurality of second coordinates corresponding to the screen 102.

Step 508: Display a track on the screen 102 according to the plurality of second coordinates.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input method for a computer system, the computer system comprising an operating system, a screen and a touch control module, the touch control module comprising a nontransparent touch pad and a touch controller, the method comprising the following steps:
   declaring, by the touch controller, the touch control module as a touch pad and a stylus according to a definition of peripheral devices of the operating system to allow the operating system to identify the touch control module as a touch pad and a stylus;
   generating, by the touch control module, a plurality of first coordinates corresponding to movement of a stylus;
   sending, by the touch control module, the plurality of first coordinates to the operating system according to a stylus packet format defined by the operating system;
   converting, by the operating system, the plurality of first coordinates to a plurality of second coordinates corresponding to the screen; and
   displaying a track on the screen according to the plurality of second coordinates;
   wherein the stylus packet format comprises report ID, coordinates of contact position and battery strength.

2. The method of claim 1, further comprising:
   recognizing a character or a symbol represented by the track.

3. The method of claim 2, further comprising:
   displaying a handwriting input block on the screen and displaying the track in the handwriting input block.

4. The method of claim 1, wherein the operating system converts the plurality of first coordinates to the plurality of second coordinates according to a resolution ratio of the screen relative to the touch pad.

5. The method of claim 1, further comprising:
   enabling an application program in response to the stylus approaching or contacting the touch pad.

6. The method of claim 1, wherein the stylus is an active stylus, and the method further comprises:
   switching the touch control module to an active stylus mode when the touch control module detects the stylus.

7. The method of claim 1, wherein the touch control module is connected to an operation unit, and the operation unit starts to operate in response to the stylus approaching or contacting the touch pad.

8. The method of claim 7, wherein the operation unit is a motor module, and the motor module is configured to generate vibration for tactile feedback.

9. A computer system, comprising:
   a screen;
   an operating system;
   a touch control module, coupled to the operating system, the touch control module comprising a nontransparent touch pad for detecting approach or contact of a stylus; and
   an application program, installed in the operating system;
   wherein the touch control module generates a plurality of first coordinates corresponding to movement of the stylus;
   the touch control module sends the plurality of first coordinates to the operating system according to a stylus packet format defined by the operating system;
   the operating system converts the plurality of first coordinates to a plurality of second coordinates corresponding to the screen; and
   the application program displays a track on the screen according to the plurality of second coordinates;
   wherein the stylus packet format comprises report ID, coordinates of contact position and battery strength; and
   wherein the touch control module comprises a touch controller connected to the touch pad, wherein the touch controller declares the touch control module as a touch pad and a stylus according to a definition of peripheral devices of the operating system, allowing the operating system to identify the touch control module as a touch pad and a stylus.

10. The computer system of claim 9, wherein the application program further recognizes a character or a symbol represented by the track.

11. The computer system of claim 10, wherein the application program provides a handwriting input block to be displayed on the screen and shows the track in the handwriting input block.

12. The computer system of claim 9, wherein the operating system converts the plurality of first coordinates to the plurality of second coordinates according to a resolution ratio of the screen relative to the touch pad.

13. The computer system of claim 9, wherein the computer system enables the application program in response to the stylus approaching or contacting the touch pad.

14. The computer system of claim 9, wherein the stylus is an active stylus, and the computer system further switches the touch control module to an active stylus mode when the stylus approaches or contacts the touch pad.

15. The computer system of claim 9, wherein the touch control module is connected to an operation unit, and the operation unit starts to operate in response to the stylus approaching or contacting the touch pad.

16. The computer system of claim 15, wherein the operation unit is a motor module, and the motor module is configured to generate vibration for tactile feedback.

* * * * *